United States Patent [19]

Hecht et al.

[11] Patent Number: 5,778,234
[45] Date of Patent: Jul. 7, 1998

[54] METHOD FOR DOWNLOADING PROGRAMS

[75] Inventors: Gideon Hecht, Seminole; Kurt Ervin Holmquist, Largo; Donald C. Snoll, Clearwater, all of Fla.

[73] Assignee: Paradyne Corporation, Largo, Fla.

[21] Appl. No.: 899,834

[22] Filed: Jul. 24, 1997

Related U.S. Application Data

[62] Division of Ser. No. 880,257, May 8, 1992.

[51] Int. Cl.$^6$ ............................................. G06F 9/44
[52] U.S. Cl. ............................................. 395/712; 395/652
[58] Field of Search ............................... 395/712, 651, 395/652

[56] References Cited

U.S. PATENT DOCUMENTS

| | | | |
|---|---|---|---|
| 4,430,704 | 2/1984 | Page et al. | 364/200 |
| 4,459,662 | 7/1984 | Skelton et al. | 364/200 |
| 4,626,986 | 12/1986 | Mori | 364/200 |
| 4,663,707 | 5/1987 | Dawson | 364/200 |
| 4,720,812 | 1/1988 | Kao et al. | 364/900 |
| 4,724,521 | 2/1988 | Carron et al. | 364/200 |
| 4,954,941 | 9/1990 | Redman | 395/712 |
| 5,053,990 | 10/1991 | Kriefels et al. | 364/900 |
| 5,136,711 | 8/1992 | Hugard et al. | 395/700 |
| 5,210,854 | 5/1993 | Beaverton et al. | 395/500 |
| 5,257,380 | 10/1993 | Lang | 395/700 |
| 5,280,627 | 1/1994 | Flaherty et al. | 395/700 |
| 5,355,498 | 10/1994 | Provino et al. | 395/700 |
| 5,361,365 | 11/1994 | Hirano et al. | 395/775 |
| 5,367,686 | 11/1994 | Fisher et al. | 395/700 |
| 5,367,688 | 11/1994 | Croll | 395/700 |

FOREIGN PATENT DOCUMENTS

| | | | |
|---|---|---|---|
| A0205692 | 6/1985 | European Pat. Off. | G06F 9/44 |
| 0500973A1 | 2/1991 | European Pat. Off. | G06F 9/445 |
| 0524719A2 | 5/1992 | European Pat. Off. | G06F 9/44 |
| 2227584 | 8/1990 | United Kingdom | G06F 12/12 |

OTHER PUBLICATIONS

*Electronic Engineering*, vol. 64, No. 783, "SGS–Thomson Block Erase Flash in 16 Bit RISC Controller", Mar. 1992, Woolrich, London GB, p. 83.

*IBM Technical Disclosure Bulletin*, vol. 34, No. 3, Aug. 1991, Armonk, NY, US pp. 286–289.

*Primary Examiner*—Emanuel Todd Voeltz
*Assistant Examiner*—Kakali Chaki
*Attorney, Agent, or Firm*—Thomas, Kayden, Horstemeyer & Risley LLP

[57] ABSTRACT

A modified version of the operating communication program of a stored program controlled apparatus is downloaded by first downloading a segment of the new package of programs which contains the essential portion of the new programs. Control of the apparatus is then transferred to the new program segment. Thereafter, utilizing the downloaded essential portion of the new package of programs, the remainder of the new package of programs is downloaded.

8 Claims, 1 Drawing Sheet

METHOD FOR DOWNLOADING PROGRAMS

This application is a division of U.S. patent application having Ser. No. 07/880,257 of Hecht,et al., filed May 8,1992.

BACKGROUND OF THE INVENTION

This invention relates to stored program controlled apparatus and, in particular, to apparatus with a capability for remote updating of its entire set of programs.

Stored program controlled apparatus can conveniently be divided into two types; one where the stored programs are completely unalterable under normal operating circumstances, and the other where the stored programs are alterable, at least at times, during normal operation. In apparatus of the first type, the program is often executed automatically and the user does not even know that the controlled apparatus is "stored program controlled". This is typically the case in equipment that is designed for people who are not knowledgeable in computers and for whom the equipment is just a tool of the trade. "Point of sale" terminals, such as check-out terminals at a supermarket, are a good example. Modems are another example. People who use this equipment desire fail-safe operation and they do not want to be bothered with loading programs, fixing program bugs, installing updated versions of software, etc.

One approach to programming such equipment is to imprint the program into read-only-memory integrated circuits and physically install the circuits into the equipment. The problem with this approach is that updated versions of the program require the creation of new sets of read-only memories and new installations.

When a communication link is present, "downloading" the programs to the equipment from a remote processor, through the communication link, forms another approach for programming the equipment. It has been known in the art for some time that it is feasible to download limited types of control information from a remote processor. It is also known to download entire machine language application programs. Often such equipment does not include writable non-volatile store, such as a hard disk, so the programs are stored in battery protected read/write memories.

This is an unattractive solution because it leaves a substantial portion of program memory to be at risk. To mitigate this problem, U.S. Pat. No. 4,724,521, suggests storing within read-only memories of the local equipment a number of general purpose routines which comprise instructions to be executed by the central processing unit to accomplish a particular program task. These, in effect, form a set of macro-instructions. The downloaded machine language program utilizes these macro-instructions to the extent possible, and thereby achieves flexibility without the need to download substantial amounts of program code.

In all of the known approaches, however, there is a program portion in the local equipment that is resident in a read-only memory, and its contents is not changed. That resident portion contains "boot-up" segments and program segments that are necessary to maintain the communication between the remote processor and the local equipment (so that the process of downloading the programs can continue). This set of programs is the "essential programs" (EP) set. This set of programs should, of course, be a non-volatile store because there is always a possibility of power loss.

The fact that the EP set is needed to maintain communications presents a problem when the EP set itself needs to be modified or updated. Indeed, that is often the case with modems, where essentially the sole function of the modem software is to support communication.

SUMMARY OF THE INVENTION

The problem of downloading a modified version of the operating communication program, and the problem of effectively updating the entire set of programs in a stored program controlled apparatus, such as a modem, is solved with a downloadable start address specification means and, optionally, with an EEPROM memory. The start address specification means stores information that is downloaded through the communication link, and that information is used in defining the address from where the communication link programs are initiated.

In accordance with the method of this invention, downloading comprises what may be considered two communication segments. In the first segment the essential portion of the new package (EP set) of programs is downloaded to some chosen location in the local apparatus and the downloadable start address specification means is loaded with the appropriate new start address. Utilizing the most recently downloaded EP set of the new communication package, the second segment downloads the remainder of the new package.

DETAILED DESCRIPTION

A modem's primary function is to enable communications between a customer's digital equipment and a remote apparatus over a transmission medium. In a modem with a stored programmed controlled architecture this communication is effected with a set of programs, which includes call establishment programs, link layer protocols with flow control and error recovery functions, and programs that handle and store the communicated data, as well as the modulation and demodulation programs used by the modem. These programs occupy a significant portion of the modem's program memory. In accordance with this invention, all programs—including the EP set of programs that carry out the elemental communications—are downloadable. That is, the apparatus employing the principles of this invention does not need to have a non-volatile "boot-up" read-only-memory. All programs (including the boot-up programs) can be stored in a single memory arrangement which, for some applications, can consist of just two memory devices.

Figure 1:
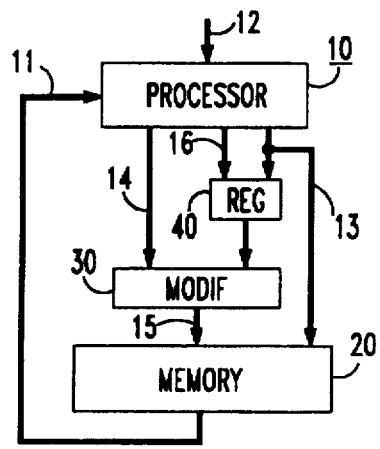
FIG. 1 presents a block diagram of an arrangement for carrying out this invention.

FIG. 1 depicts one structure that, in conformance with the principles of this invention, enables the downloading of programs to the modem's program memory. FIG. 1 includes a processor element 10 with a port for receiving signals from, and sending signals to, line 12. Processor 10 is also responsive to line 11 data from program memory 20, and it supplies address and data to memory 20 via bus 13 and bus 14, respectively. In a conventional processor structure, bus 14 is connected to an address port of memory 20. In FIG. 1, address modifier 30 is interposed between processor 10 and program memory 20, with bus 15 supplying the address information to memory 20. Modifier 30 is responsive to register 40, which is loaded with bus 13 data when the register is enabled by bus 16. Modifier 30 is a modulo M adder, where M is the size of memory 20. A typical stored program controlled modem also includes a read/write data memory, means for interfacing with the transmission medium, means for interfacing with the local digital equipment, and perhaps other data and control ports. For purposes of this invention, however, these other elements are irrelevant, so they are not included in the drawing.

It should be understood that line 12 in the FIG. 1 architecture effectively offers a "remote execution" capability to processor 10, in that the programs which are executed by processor 10 are affected by data supplied by line 12. For example, data supplied by line 12 can effect branching to programs that are normally dormant. One such normally dormant program is a program that downloads information to the program memory. It should also be understood, and noted, that although this invention is described in connection with modems, its principles are applicable to all stored program apparatus. In particular, the principles of this invention are applicable to all situations where it is desirable to download an entire set of new programs, including the EP set. For example, this invention is useful in PCs, "point of sale" terminals, etc.

The operation of the FIG. 1 apparatus is quite simple. The processes carried out by the FIG. 1 apparatus are effected by executing a sequence of instructions that the processor receives from program memory 20 via bus 11. In turn, processor 10 determines which instructions are delivered to it by controlling the addresses applied to memory 20 (typically by controlling a "program counter" within processor 10, which is not shown in the FIG.). The primary difference between a conventional microprocessor arrangement and the FIG. 1 arrangement is that the addresses supplied on bus 14 are not the actual addresses that are applied to program memory 20, because of the interposed circuit 30. One might call these addresses "virtual addresses", which are translated into the real addresses by the additive constant applied by register 40 to modifier circuit 30.

The exact structure and organization of the programs executed by the FIG. 1 arrangement is not really relevant to this invention, but it is to be understood that a protocol exists for sending information out on line 12 and for receiving information from line 12. This protocol provides a mechanism for intelligent communication with processor 10, which includes, for example, knowing when the received data is commands or data, and whether to store the received data in memory 20 or elsewhere.

Figure 2:
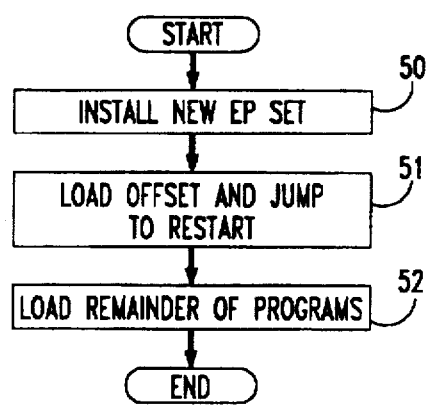
FIG. 2 is a flow diagram of a downloading process in accordance with this invention.

The programs that can be executed by the FIG. 1 arrangement reside throughout memory 20, but the set of programs that is essential to the maintenance of communication with line 12 (the EP set) may, advantageously, occupy a contiguous segment of memory 20 addresses in the range 0 to N. Within that range of addresses there is a subroutine for installing a new EP set In accordance with the principles of this invention, the entire set of programs contained in memory 20 can be over-written with a new set of programs (in a process initiated by the apparatus itself or by the party connected to the apparatus via line 12) by following the procedure outlined in FIG. 2. In step 50 of FIG. 2, a command is received on line 12 to branch to the subroutine in the EP set that installs new EP sets (that command may simply be a data word that is installed in a particular read/write memory location). After supplying the branch instruction, the new EP set of programs are downloaded via line 12. Optionally, an offset address that is the starting address of the new EP set (the address corresponding to 0 in the existing EP set) is also downloaded. Alternatively, the offset address may be predefined, in which case it does not need to be supplied by line 12. In any event, the offset address is greater than N and less than M–N. It may be noted that N must be less than M/2, because two EP sets must temporarily coexist in memory 20.

After the new EP set is installed in memory locations X through X+N, where X is the offset address (X=M/2, for example), memory locations that serve as software-defined registers in the new EP set are populated with data that is found in the corresponding software-defined addresses in the active EP set. Thereafter, according to step 51, register 40 is loaded with the offset address.

The immediate effect of loading the offset address into register 40 is to transfer control to the newly installed EP set. That means that the program in the new EP set to which control is transferred, must be at a predetermined logic point so that the communication can continue seamlessly. This minor requirement can be easily accommodated by proper planning of the new EP set. Once operation proceeds under control of the new EP set of programs, according to FIG. 2, step 52 conditions processor 10 to account for the offset present in register 40 and loads the remainder of programs destined for memory 20 in addresses higher than X+N (modulo M).

It is obviously important to protect the information loaded into memory 20 from loss. At the very least, that means that memory 20 must be non-volatile. Memory 20 must also be relatively fast because it directly affects the processing speed that can be attained with the FIG. 1 arrangement. Currently, we use an electrically bulk erasable, programmable, read-only memory (FLASH EEPROM) to form memory 20. This memory must be erased in bulk before new information can be written in it. To install a new EP in such a memory, it is recalled that the EP set must occupy less than half of memory 20, and that makes it convenient to construct memory 20 from at least two distinct chips (distinct in the sense of being able to erase one and not the other). Each segment of the downloading process begins with a bulk erasure of one of the memory 20 halves.

To summarize the downloading process of this invention,

1. Bulk erase the that half of memory 20 which does NOT contain the EP set of programs;
2. download a new EP set of programs to the erased half of memory 20;
3. download the offset address to pass control to the new EP set of programs;
4. bulk erase the other half of memory 20;
5. download the remainder of programs into memory 20.

If register 40 is to contain the offset address for a substantial time after downloading is accomplished, then its contents must be protected in a manner not unlike that of memory 20. Of course, register 40 can manufactured together with memory 20 and be an EEPROM. However, that is not absolutely necessary, and manufacturing costs could benefit if register 40 were constructed as part of the read/write memory or as part of processor 10.

Figure 3:
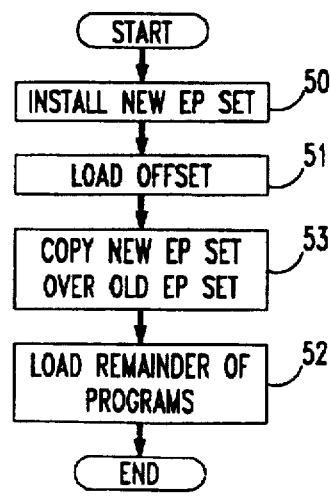
FIG. 3 is a flow diagram of an augmented downloading process in accordance with this invention.

Register 40 may be a volatile memory if the downloading process is carried out as depicted in FIG. 3. Specifically, by including a copy subroutine in the EP set of programs, the downloading process can be modified to the following (assuming the EP set is in the first half of memory 20):

1. Bulk erase the second half of memory 20;

2. download a new EP set of programs to the second half of memory 20;

4. download the offset address to pass control to the new EP set of programs;

5. bulk erase the first half of memory 20;

6. copy the contents of the second half of memory 20 into the first half of memory 20;

7. reset the offset address to 0; and 8. download the remainder of programs into memory 20.

Admittedly, during the copy sequence (which may also be a "move" sequence) the arrangement is vulnerable to power failures. Since the time of copying or moving is very small, this is a very unlikely event. Still, to protect against this unlikely event, the power source can be designed to have sufficient reserve to complete the copy operation, or to protect the starting address. A capacitor at the output of the power supply may supply the necessary power reserve.

In the arrangement described above where memory 20 consists of two FLASH EEPROM chips, register 40 needs to have only one bit of memory, and modifier circuit 30 can be merely an Exclusive OR gate which, with the aid of the one bit memory of register 40, selects the bank of memory that is active.

We claim:

1. A method for installing a new set of communication programs $P_{new}$ into a stored program controlled apparatus that includes a communication port and a memory by transmitting said set of programs $P_{new}$ to said apparatus via said port, with the aid of a set of communications programs $P_{old}$ already resident in said memory, where said set of programs $P_{old}$ contains a subset of programs $EP_{old}$ that occupy less than half of the memory and said set of programs $P_{new}$ also contains a subset of programs $EP_{new}$ that, when installed, occupy less than half of the memory, comprising the steps of:

installing the $EP_{new}$ programs in a first area of said memory that contains programs other than the $EP_{old}$ programs, thereby overwriting at least a portion of one program in said $P_{old}$ set of programs;

altering operation of said apparatus to execute the $EP_{new}$ programs instead of the $EP_{old}$ programs; and installing the remaining programs of said $P_{new}$ set of programs in a second area of said memory, said second area constituting memory locations not occupied by the $EP_{new}$ programs.

2. The method of claim 1 further comprising a step of moving, interposed between said step of altering operation of the apparatus and said step of installing the remaining programs, that installs said $EP_{new}$ programs into memory locations starting at a location that corresponds to a starting location of the $EP_{old}$ programs, and a second step of altering operation of said apparatus to execute the $EP_{new}$ programs in the installed locations by said step of moving.

wherein said installing the remaining programs of said $P_{new}$ set of programs stores the programs in memory locations not occupied with the $EP_{new}$ programs installed by said step of moving.

3. The method of claim 1, further comprising the steps of:

erasing said first area of said memory, said erasing step to be performed prior to said step of installing the $EP_{new}$ programs into said first area of said memory; and erasing said second area of said memory, said erasing step to be performed after said step of altering operation of the apparatus and prior to said step of installing the remaining programs of said $P_{new}$ set of programs.

4. The method of claim 1, wherein said step of altering operation of said apparatus to execute said $EP_{new}$ programs is accomplished by installing an offset address to pass control of said apparatus to said $EP_{new}$ programs.

5. A method for installing a new set of communication programs $P_{new}$ into a stored program controlled apparatus that includes a communication port and a memory by transmitting said set of programs $P_{new}$ to said apparatus via said port, with the aid of a set of communications programs $P_{old}$ already resident in said memory, where said set of programs $P_{old}$ contains a subset of programs $EP_{old}$ that occupy less than half of the memory and said set of programs $P_{new}$ also contains a subset of programs $EP_{new}$ that, when installed, occupy less than half of the memory, comprising the steps of:

installing the $EP_{new}$ programs in a first area of said memory that contains programs other than the $EP_{old}$ programs, thereby overwriting at least a portion of one program in said $P_{old}$ set of programs;

altering operation of said apparatus to execute the $EP_{new}$ programs instead of the $EP_{old}$ programs;

moving the $EP_{new}$ programs from said first area of memory to a second area of said memory; and installing the remaining programs of said $P_{new}$ set of programs in said first area of memory.

6. The method of claim 5, further comprising the step of:

erasing said first area of said memory, said erasing step to be performed prior to said step of installing the $EP_{new}$ programs into said first area of said memory.

7. The method of claim 5, wherein said moving step further comprises the steps of:

copying the $EP_{new}$ programs from said first area of memory to said second area of memory; and erasing said first area of memory.

8. The method of claim 5, wherein said step of altering operation of said apparatus to execute said $EP_{new}$ programs is accomplished by installing an offset address to pass control of said apparatus to said $EP_{new}$ programs.

* * * * *

UNITED STATES PATENT AND TRADEMARK OFFICE
CERTIFICATE OF CORRECTION

PATENT NO. : 5,778,234
DATED : July 7, 1998
INVENTOR(S) : Hecht, et al.

It is certified that error appears in the above-identified patent and that said Letters Patent is hereby corrected as shown below:

In column 4, line 45, delete "that".

In column 5, line 48, insert ":" after "comprising".

In column 6, line 1, insert "step of" after the first appearance of "said" and before "installing".

Signed and Sealed this

Seventeenth Day of November, 1998

Attest:

BRUCE LEHMAN

*Attesting Officer*       *Commissioner of Patents and Trademarks*